United States Patent
Dempsey et al.

(10) Patent No.: US 8,313,085 B2
(45) Date of Patent: Nov. 20, 2012

(54) FLUID FLOW CONTROL APPARATUS

(75) Inventors: Brian Dempsey, San Rafael, CA (US); Brian Arellanes, San Rafael, CA (US)

(73) Assignee: U.S. Innovations, Inc., San Rafael, CA (US)

( * ) Notice: Subject to any disclaimer, the term of this patent is extended or adjusted under 35 U.S.C. 154(b) by 410 days.

(21) Appl. No.: 12/637,515

(22) Filed: Dec. 14, 2009

(65) Prior Publication Data
US 2011/0024663 A1    Feb. 3, 2011

Related U.S. Application Data

(60) Provisional application No. 61/230,996, filed on Aug. 3, 2009.

(51) Int. Cl.
*F16K 5/02* (2006.01)
*B05B 1/30* (2006.01)

(52) U.S. Cl. ..................... 251/207; 239/581.1
(58) Field of Classification Search ........... 251/205, 251/206, 207, 297; 239/581.1, 581.2, 586
See application file for complete search history.

(56) References Cited

U.S. PATENT DOCUMENTS

| | | | | |
|---|---|---|---|---|
| 458,762 A * | 9/1891 | Charonnat | | 239/73 |
| 541,716 A * | 6/1895 | Callahan | | 137/630.14 |
| 3,949,966 A | 4/1976 | Fabish | | |
| 4,148,460 A | 4/1979 | Kinsler | | |
| 4,191,332 A * | 3/1980 | De Langis et al. | | 239/428.5 |
| 4,591,098 A * | 5/1986 | Ridenour | | 239/288.3 |
| 4,718,638 A | 1/1988 | Phlipot et al. | | |
| 4,901,976 A * | 2/1990 | Smith | | 251/206 |
| 4,909,277 A | 3/1990 | Vandiver | | |
| 4,921,171 A * | 5/1990 | Cupit | | 239/314 |
| 5,205,538 A * | 4/1993 | Mackoway et al. | | 251/297 |
| 5,244,182 A * | 9/1993 | Pacht | | 251/205 |
| 5,246,201 A * | 9/1993 | Messick | | 251/208 |
| 6,095,491 A | 8/2000 | Kriesel | | |
| 6,273,133 B1 | 8/2001 | Williamson et al. | | |
| 7,363,680 B2 * | 4/2008 | Legatt | | 15/320 |
| 7,503,345 B2 | 3/2009 | Paterson et al. | | |
| 2001/0025942 A1 * | 10/2001 | Lotz et al. | | 251/297 |
| 2005/0247901 A1 | 11/2005 | Wang | | |
| 2007/0280775 A1 | 12/2007 | Schouten | | |

OTHER PUBLICATIONS

Printout from Walmart.com dated Mar. 1, 2010 listing item "Speakman Patented Ultimate Flow Control Valve" for sale.

* cited by examiner

*Primary Examiner* — Eric Keasel
*Assistant Examiner* — Hailey K Do
(74) *Attorney, Agent, or Firm* — Knobbe Martens Olson & Bear LLP

(57) ABSTRACT

An apparatus for controlling a fluid flow rate includes a main body having a fluid flow passage and a cavity adapted to receive a flow control body having two or more flow channels therethrough. The flow control body may be moved within the cavity to two or more positions, each position corresponding to fluid communication between the flow passage of the main body and a different one of the flow channels of the flow control body. The flow control body may be held in each position by a detent feature that resists movement of the flow control body until a movement force acting upon the flow control body exceeds a threshold.

6 Claims, 4 Drawing Sheets

FLUID FLOW CONTROL APPARATUS

CLAIM FOR PRIORITY

The present application claims priority to U.S. Provisional Patent Application No. 61/230,996, filed Aug. 3, 2009, the entirety of which is hereby incorporated herein by reference.

BACKGROUND

1. Field of the Invention

The present application relates to apparatuses and methods for regulating a flow of fluid through a pipe or other conduit.

2. Description of the Related Art

Low flow water devices have been introduced that are designed to conserve shower water use. Conventional water conserving devices are typically showerheads that reduce the water pressure via valves, ball joints or other flow reducing designs. Some conventional water conserving devices may stop the flow of water completely via a valve or a closing mechanism.

Conventional low flow water devices suffer from a number of different disadvantages. These disadvantages include complexity, cost, frequency of malfunctioning, time or difficulty in switching between flow settings, damage to pipes, change to water temperature, excessive flow reduction, or the need to replace the existing showerhead.

There is a need for a device that reduces the flow of water that is simple to construct, has limited moving parts, is inexpensive to assemble, does not damage pipes, is very reliable, and does not require replacement of the existing showerhead for water flow.

SUMMARY

In one embodiment, the present application provides an apparatus configured to control a rate of flow of fluid. The apparatus comprises a flow adjustment member and a main body. The flow adjustment member has first and second fluid flow channels therethrough, the first and second fluid flow channels having substantially different cross-sectional sizes. The flow adjustment member also includes first and second securing pin recesses. The main body includes a fluid inlet, a fluid outlet, a fluid flow passage extending from the inlet to the outlet, and a cavity adapted to receive the flow adjustment member. The flow adjustment member is moveable within the cavity to a first position in which the first fluid flow channel fluidly communicates with the fluid flow passage of the main body. The flow adjustment member is also moveable within the cavity to a second position in which the second fluid flow channel fluidly communicates with the fluid flow passage of the main body. The main body also includes at least one securing pin passage adapted to receive a securing pin configured to engage the first securing pin recess or the second securing pin recess, such that engagement of the securing pin with either the first securing pin recess or the second securing pin recess causes the securing pin to resist movement of the flow adjustment member until a movement force acting on the flow adjustment member exceeds a threshold.

In another embodiment, the present application provides an apparatus configured to control a rate of flow of fluid. The apparatus comprises a flow control body, a main body, and a detent feature. The flow control body includes first and second fluid flow channels therethrough, the first and second channels having substantially different cross-sectional sizes to effect substantially different fluid flow rates therethrough. The main body includes a fluid inlet, a fluid outlet, a fluid flow passage extending from the inlet to the outlet, and a cavity adapted to receive the flow control body. The flow control body is moveable within the cavity to a first position in which the fluid flow passage of the main body fluidly communicates with the first fluid flow channel but not with the second fluid flow channel. The flow control body is also moveable within the cavity to a second position in which the fluid flow passage of the main body fluidly communicates with the second fluid flow channel but not with the first fluid flow channel. The detent feature resists movement of the flow control body from at least one of the first and second positions until a movement force acting on the flow control body exceeds a threshold.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENTS

Figure 1:
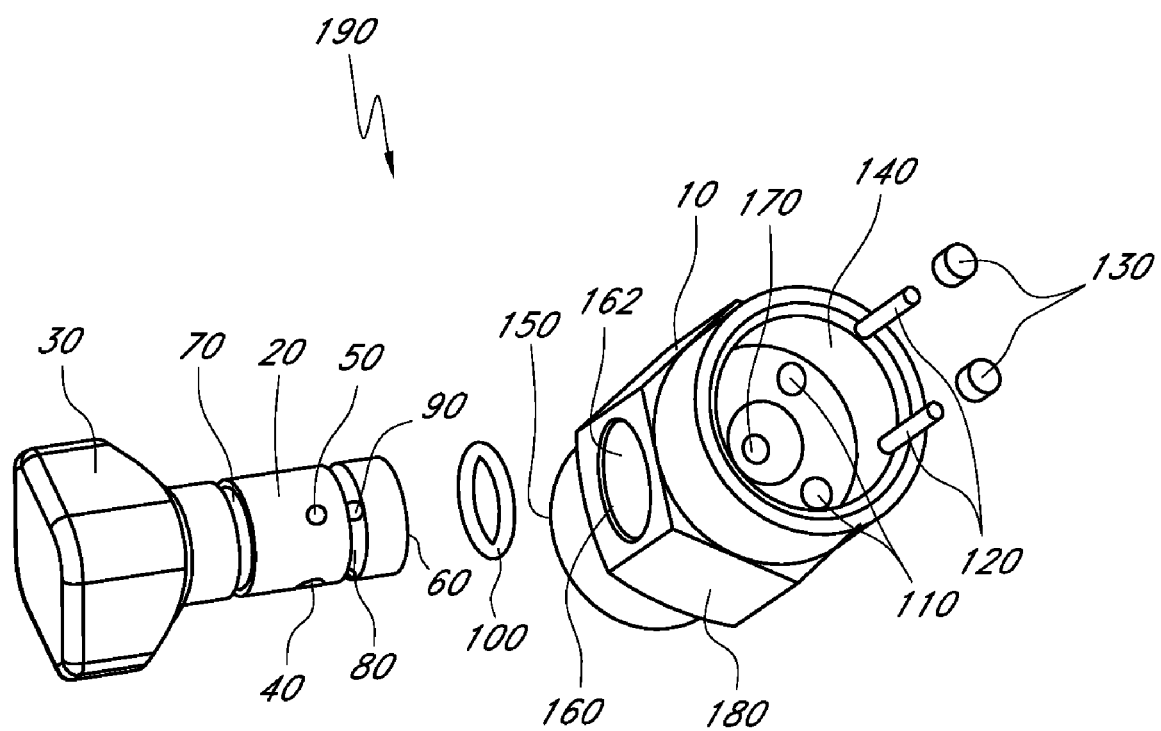
FIG. 1 is an exploded perspective view of one embodiment of a flow control device.

FIG. 1 is an exploded perspective view of one embodiment of a flow control device. The illustrated flow control device 190 includes a main body 10 and a flow adjustment member or flow control body 20.

The illustrated main body 10 includes a fluid inlet 140, a fluid outlet 150, a fluid flow passage 170, and an opening 160. The main body 10 may also include one or more securing pin passages 110, as will be described in detail further below. The fluid inlet 140 of the main body 10 may contain threading on the interior and may be adapted to connect to a pipe, such as a shower water supply pipe. The fluid outlet 150 may contain threading on the exterior and may be adapted to connect to a pipe or directly to a showerhead apparatus. Persons of ordinary skill in the art will recognize that the fluid inlet 140 may contain threading on the exterior and/or the fluid outlet 150 may contain threading on the interior.

With continuing reference to FIG. 1, the fluid flow passage 170 may extend through the main body 10 and interconnect the fluid inlet 140 and the fluid outlet 150, thereby allowing the passage of a fluid, such as water, from the inlet 140 to the outlet 150. In a preferred embodiment, the fluid inlet 140, the fluid outlet 150, and the fluid flow passage 170 have a circular cross-section, and the diameter of the fluid flow passage cross-section is smaller than the diameter of the cross-section of either the fluid inlet or the fluid outlet.

With continuing reference to FIG. 1, the main body 10 includes a cavity 162 having, at one end, the opening 160. The cavity 162 may be adapted so that it intersects the fluid flow passage 170. As illustrated in FIG. 1, the cavity 162 may be adapted to receive the flow adjustment member 20. For example, the flow adjustment member 20 may be inserted into the opening 160 beginning with an insertion end 60 of the member 20. In a preferred embodiment, the cavity 162 is adapted to allow the flow adjustment member 20 to rotate within the cavity 162 to two or more positions. Although the opening 160 and the cavity 162 are illustrated as being positioned at a central portion 180 of the main body 10, skilled artisans will recognize that the opening 160 and cavity 162 may be positioned at a number of positions with respect to the main body 10.

The illustrated flow adjustment member 20 includes a first fluid flow channel 40, a second fluid flow channel 50, a twist lever 30, an o-ring groove 70, and a securing pin groove 80. The first fluid flow channel 40 and the second fluid flow channel 50 may be adapted to allow the passage of a fluid through the flow adjustment member 20. When the flow adjustment member 20 is inserted into the main body 10 as described above, the flow adjustment member may be rotated within the cavity 162 such that either the first fluid flow channel 40 or the second fluid flow channel 50 fluidly communicates with the fluid flow passage 170, thereby controlling the flow of fluid through the flow control device 190. In a preferred embodiment, the sizes of the first and second fluid flow channels 40 and 50 (e.g., cross-sectional sizes, or smallest transverse cross-section if the cross-sectional size varies along the length of the channel) are different, corresponding to a high-flow-rate condition and a low-flow-rate condition. In some embodiments, the size of the first fluid flow channel 40 is adapted so that the flow of fluid equals about 2.5 gallons per minute (gpm) in the high-flow condition. In those or other embodiments, the size of the second fluid flow channel 50 is adapted so that the flow of fluid equals about 1.0 gpm in the low-flow condition.

With continuing reference to FIG. 1, the illustrated flow adjustment member 20 has a cross-section that is substantially circular. Once the flow control apparatus 190 of FIG. 1 is assembled, the flow adjustment member 20 may be moved within the cavity 162 by rotation. In a preferred embodiment, a first end of the first fluid flow channel 40 is arranged at about a 90° increment from a first end of the second fluid flow channel 50 about a perimeter or circumference of the flow adjustment member 20, so that about a 90° turn of the twist lever 30 toggles the flow rate between the high-flow condition and the low-flow condition. In another preferred embodiment, each end of the first fluid flow channel 40 is arranged at about a 90° increment from each end of the second fluid flow channel 50 about the flow adjustment member 20, so that every turn of about 90° of the twist lever 30 toggles the flow rate between the high-flow condition and the low-flow condition.

To assist the user in rotating the flow adjustment member 20 within the cavity 162, the flow control apparatus may include the twist lever 30. Although the illustrated twist lever 30 is shown as being positioned opposite the insertion end 60 of the flow adjustment member 20, skilled artisans will recognize that the twist lever 30 could be located in a variety of positions on the flow adjustment member 20.

The flow adjustment member 20 may include the o-ring groove 70 and the securing pin groove 80. The o-ring groove 70 may be adapted to receive an o-ring 100 to prevent fluid leakage once the flow adjustment member 20 is inserted into the cavity 162. In particular, the o-ring 100 may be adapted to be in sealing contact with the inner periphery of the cavity 162 of the main body 10. The flow adjustment member 20 may include the securing pin groove 80 and one or more securing pin recesses 90 for engaging one or more securing pins, as will be described below.

As illustrated in FIG. 1, the main body 10 may include one or more securing pin passages 110 adapted to receive one or more securing pins 120. Although the insertion openings of the securing pin passages 110 are illustrated as being located at the end of the main body 10 corresponding to the fluid inlet 140, persons of ordinary skill in the art will recognize that the insertion openings of the securing pin passages 110 could be positioned at other locations of the main body 10, including the central portion 180 of the main body or the end of the main body corresponding to the fluid outlet 150. In one embodiment, the securing pin passages 110 have insertion openings on both ends of the main body 10, to allow insertion of the one or more securing pins 120 on either end. The position(s) and orientation(s) of the one or more securing pin passages 110 with respect to the main body 10 may vary among different embodiments. In one embodiment, the one or more securing pin passages 110 are oriented substantially parallel to at least a portion of the fluid flow channel 170 of the main body 10. In another embodiment, the securing pin passages 110 may be positioned so that a portion, but not all, of each securing pin passage intersects the cavity 162. The one or more securing pins 120 may be secured to the one or more securing pin channels 110 by one or more pin caps 130 adapted to engage and be fixed with respect to the passages 110, such as by a snap-fit engagement.

In a preferred embodiment, the securing pin groove 80 includes at least two securing pin recesses 90, which may be arranged at about 90° increments about the circumference of the flow adjustment member 20, and the main body 10 includes at least one securing pin passage 110. Once the flow control device 190 is assembled, at least one securing pin 120 may be inserted into the at least one securing pin passage 110 and positioned such that the pin 120 engages the securing pin groove 80 of the flow adjustment member 20. The flow adjustment member 20 may then be rotated within the cavity 162 of the main body 10, thereby causing the at least one securing pin 120 to slide along the securing pin groove 80 until the securing pin 120 engages one of the securing pin recesses 90. The securing pin recesses 90 may be arranged so that the at least one securing pin 120 engages the securing pin recesses when the first fluid flow channel 40 or the second fluid flow channel 50 fluidly communicates with the fluid flow passage 170. Once a securing pin 120 engages a securing pin recess 90, the securing pin 120 may be adapted to resist rotation of the flow adjustment member 20 until a torque acting on the member 20 exceeds a threshold.

In a preferred embodiment, the securing pin groove 80 includes four securing pin recesses 90, which may be arranged at about 90° increments about the circumference of the flow adjustment member 20, and the main body 10 includes at least one securing pin passage 110. Additionally, the flow adjustment member 20 may be rotated within the cavity 162 to a first position, a second position, a third position and a fourth position, wherein the first fluid flow channel 40 fluidly communicates with the fluid flow passage 170 of the main body 10 in the first and third positions, and wherein the second fluid flow channel 50 fluidly communicates with the fluid flow passage 170 of the main body 10 in the second and fourth positions. Once the flow control device 190 is assembled, at least one securing pin 120 may be inserted into the at least one securing pin passage 110 and positioned such that the pin 120 engages the securing pin groove 80 of the flow adjustment member 20. The flow adjustment member 20 may then be rotated within the cavity 162, thereby causing the at least one securing pin 120 to slide along the securing pin groove 80 until the securing pin 120 engages one of the four securing pin recesses 90. The four securing pin recesses 90 may be arranged so that every rotation of about 90° toggles the flow adjustment member (1) between the first and second positions, (2) between the first and fourth positions, (3) between the second and third positions, or (4) between the third and fourth positions. Furthermore, the four securing pin recesses 90 may be arranged so that each securing pin 120 engages one of the securing pin recesses when the flow adjustment member is in the first position, the second position, the third position or the fourth position within the cavity 162. Once a securing pin 120 engages a securing pin recess 90, the securing pin 120 may be adapted to resist rotation of the flow adjustment member 20 until a torque acting on the member 20 exceeds a threshold.

In a preferred implementation, the securing pin groove 80 includes four securing pin recesses 90, arranged at about 90° increments about the circumference of the flow adjustment member 20, and the main body 10 includes two securing pin passages 110 adapted to simultaneously receive two securing pins 120. The flow adjustment member 20 may then be rotated within the cavity 162 of the main body 10, thereby causing the two securing pins 120 to slide along the securing pin groove 80 until the two securing pins 120 simultaneously engage two of the securing pin recesses 90. The flow adjustment member 20 may be positioned so that the two securing pins 120 simultaneously engage a first securing pin recess and a third securing pin recess, an arrangement in which there is fluid communication between the flow channel 40 and the flow passage 170. The flow adjustment member 20 can alternatively be positioned so that the two securing pins 120 simultaneously engage a second securing pin recess and a fourth securing pin recess, an arrangement in which there is fluid communication between the flow channel 50 and the flow passage 170. Once the securing pins 120 simultaneously engage two of the securing pin recesses 90, the two securing pins 120 may be adapted to resist rotation of the flow adjustment member 20 until a torque acting on the member 20 exceeds a threshold.

In another embodiment, the securing pin groove 80 includes three securing pin recesses 90 arranged at about 120° increments about the circumference of the flow adjustment member 20, and the main body 10 includes at least one securing pin passage 110 and at least one securing pin 120. The three securing pin recesses 90 may be arranged so that the at least one securing pin 120 engages a securing pin recess when the first fluid flow channel 40 or the second fluid flow channel 50 fluidly communicates with the fluid flow passage 170. Once a securing pin 120 engages a securing pin recess 90, the securing pin 120 may be adapted to resist rotation of the flow adjustment member 20 until a torque acting on the member 20 exceeds a threshold. As persons of ordinary skill in the art will recognize, the flow adjustment member 20 could be adapted to include a third fluid flow channel (not illustrated) with a corresponding third-flow condition, such that the at least one securing pin 120 engages one or more of the three securing pin recesses 90 when the first fluid flow channel 40, the second fluid flow channel 50, or the third fluid flow channel fluidly communicates with the fluid flow passage 170. Furthermore, skilled artisans will recognize that a third flow channel through the flow adjustment member 20 need not be included, and that in some embodiments this may advantageously allow the at least one securing pin 120 to engage one or more of the three securing pin recesses 90 when no fluid flow channel of the member 20 fluidly communicates with the fluid flow passage 170, thereby permitting a no-flow condition.

Persons of ordinary skill in the art will recognize that the embodiments described above are merely illustrative and that the securing pin groove 80 may include securing pin recesses 90 arranged at a variety of circumferential increments about the groove, and the main body 10 may include a multitude of securing pins and passages. Skilled artisans will recognize that the flow control member 20 may include any number of flow channels (e.g., 40, 50) and corresponding flow conditions, and each may be detented using one or more securing pins (e.g., 120) and recesses (e.g., 90).

Furthermore, the embodiments discussed above were described in the context of one or more pins, pin grooves, pin recesses, and/or pin passages for illustrative purposes only. Skilled artisans will recognize that there are many possible ways to secure a flow adjustment member in a main body at a multitude of positions, and that the embodiments described herein may utilize any detent feature that resists movement until a movement force acting on the flow adjustment member exceeds a threshold.

Figure 2:
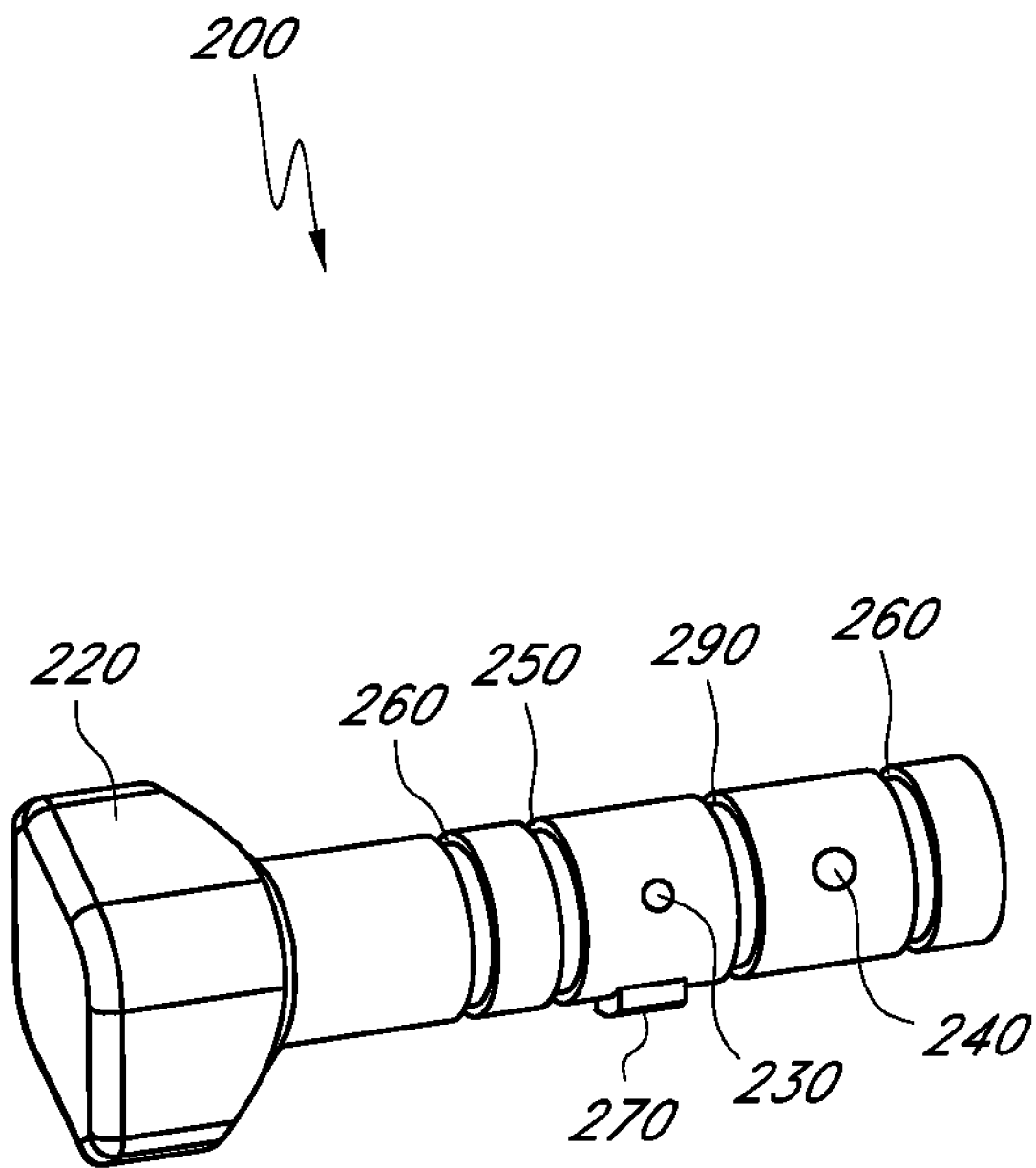
FIG. 2 is a perspective view of a flow adjustment member in accordance with an alternative embodiment of a flow control device.

For example, FIG. 2 is a perspective view of a flow adjustment member in accordance with another embodiment. The illustrated flow adjustment member 200 includes a first fluid flow channel 230, a second fluid flow channel 240, a first pin groove 250, a second pin groove 290, o-ring grooves 260, a push-pull knob 220, and tongue 270. Skilled artisans will recognize that the illustrated flow adjustment member 200 may be inserted in a main body (e.g., 10) to form an assembled fluid control device, as described above with reference to FIG. 1. In particular, the main body may include a cavity (e.g., 162) and a fluid flow passage (e.g., 170), wherein the cavity may intersect the fluid flow passage. Furthermore, the cavity may be adapted to receive the flow adjustment member 200. The main body may also include one or more securing pin passages (e.g., 110) having one or more securing pins (e.g., 120) and pin caps (e.g., 130).

The cavity of the main body described above may be adapted to allow the flow adjustment member 200 to move within the cavity to two or more positions, such as by sliding axially. In one embodiment, when the flow adjustment member 200 is inserted into the main body as described above, the flow adjustment member may axially slide within the cavity such that either the first fluid flow channel 230 or the second fluid flow channel 240 fluidly communicates with the fluid flow passage of the main body, thereby controlling the flow of fluid through the assembled fluid control device. In a preferred embodiment, the sizes of the first and second fluid flow channels 230 and 240 (e.g., transverse cross-sectional sizes, or smallest transverse cross-section if the cross-sectional size varies along the length of the channel) are different, corresponding to a high-flow condition and a low-flow condition. In some embodiments, the size of the first fluid flow channel 230 is such that the flow of fluid equals about 2.5 gpm in the high-flow condition. In those or other embodiments, the size of the second fluid flow channel 240 is such that the flow of fluid equals about 1.0 gpm in the low-flow condition.

The flow adjustment member 200 may include a push-pull knob 220 to aid the user in sliding the flow adjustment member within the cavity to two or more positions. In one embodiment, the flow adjustment member 200 may include a tongue 270 that engages a corresponding groove within the cavity (e.g., 162) of the main body, to prevent the flow adjustment member 200 from rotating. In another embodiment, the flow adjustment member 200 includes a longitudinal groove (not shown) on its insertion end portion, the groove adapted to engage a corresponding tongue within the cavity (e.g., 162) of the main body, to likewise prevent the member 200 from rotating. The details of using the tongue 270 and/or the groove will be discussed in detail below with reference to FIGS. 3 and 7A-7B.

With continuing reference to FIG. 2, the flow adjustment member 200 may include one or more o-ring grooves 260. The one or more o-ring grooves 260 may be adapted to receive one or more o-rings (e.g., 100) to help prevent fluid leakage once the flow adjustment member 200 is inserted into the cavity of the main body. In particular, the one or more o-rings may be adapted to be in sealing contact with the inner periphery of the cavity of the main body. Persons of ordinary skill in the art will recognize that having multiple o-ring grooves and o-rings may be advantageous. For example, having multiple o-ring grooves and o-rings may help to prevent fluid leakage in an embodiment in which the cavity of the main body is a passage extending entirely through the main body. Such an embodiment may be desirable to facilitate an increased range of axial sliding of the flow adjustment member 200 to multiple positions within the cavity.

Persons of ordinary skill in the art will recognize that the o-ring grooves 260 may not be necessary. For example, in some embodiments o-rings may not be used when assembling the flow control device. Additionally, even in the absence of the o-ring grooves 260, o-rings may still be used. For example, one such embodiment might involve inserting one or more annular o-ring grooves in the inner periphery of the cavity of the main body, as described below with reference to FIG. 5.

As illustrated in FIG. 2, the flow adjustment member 200 may include the first pin groove 250 and the second pin groove 290. In a preferred embodiment, the main body includes at least one securing pin passage (e.g., 110) and at least one securing pin (e.g. 120). Once the flow adjustment member 200 is inserted into the cavity of the main body, the flow adjustment member may be positioned such that the at least one pin extends across and contacts the flow adjustment member. A user may then slide the flow adjustment member 200 within the cavity of the main body, thereby causing the member 200 to slide against and along the at least one securing pin, until the at least one securing pin engages the first pin groove 250 or the second pin groove 290. Skilled artisans will recognize that the flow adjustment member 200 may be permitted to move between positions by utilizing a variety of techniques. For example, flexibility in the securing pins, give (e.g., designed-in clearance) between the securing pins and the securing pin passages, or give between the flow adjustment member 200 and the cavity of the main body may be adjusted to accomplish this purpose. In embodiments in which one or more o-rings are present, skilled artisans will recognize that the amount of give may be selected so as to not jeopardize the fluid seal created by the one or more o-rings.

The first and second pin grooves 250 and 290 may be arranged so that the at least one securing pin engages the first groove 250 when the first fluid flow channel 230 channel fluidly communicates with the fluid flow passage (e.g., 170) of the main body, and also so that the at least one securing pin engages the second groove 290 when the second fluid flow channel 240 fluidly communicates with the fluid flow passage of the main body. Once the at least one securing pin engages the first pin groove 250 or the second pin groove 290, the at least one securing pin may be adapted to resist axial sliding of the flow adjustment member 200 until a movement force acting on the member 200 exceeds a threshold.

With continuing reference to FIG. 2, the first pin groove 250 and the second pin groove 290 are illustrated as being annular for illustrative purposes only. Skilled artisans will recognize that the first pin groove 250 and the second pin groove 290 may alternatively extend over a limited portion of the perimeter or circumference of the flow adjustment member 200, and that this may be advantageous under certain circumstances. For example, when sliding the flow adjustment member 200 within the cavity of the main body between a first position corresponding to the first fluid flow channel 230 and a second position corresponding to the second fluid flow channel 240, it may be desirable that the second pin groove 290 (which, in the illustrated embodiment, is positioned between the channels 230 and 240) not fluidly communicate with the flow passage (e.g., 170) of the main body, in order to prevent fluid from flowing into the second pin groove 290 and to the outlet 150.

Persons of ordinary skill in the art will recognize that the embodiments described above are merely illustrative and that the pin grooves may be arranged in a variety of ways and that the main body 10 may include a variety of securing pins and passages. For example, the second pin groove 290 need not be between the first fluid channel 230 and the second fluid flow channel 240, and could instead be positioned between the first pin groove 250 and the first fluid channel 230. This may prevent fluid from flowing in the second pin groove 290 when sliding the flow adjustment member 200 between positions within the cavity. Skilled artisans will recognize that the flow control member 200 may include any number of flow channels (e.g., 40, 50) and corresponding flow conditions, and each may be detented using one or more securing pins (e.g., 120) and recesses (e.g., 90).

Furthermore, the embodiments discussed above were described in the context of one or more pins, pin grooves, and/or pin passages for illustrative purposes only. Skilled artisans will recognize that there are many possible ways to secure a flow adjustment member in a main body at a multitude of positions, and that the embodiments described herein may utilize any detent feature that resists movement until a movement force acting on the flow adjustment member exceeds a threshold.

Figure 3:
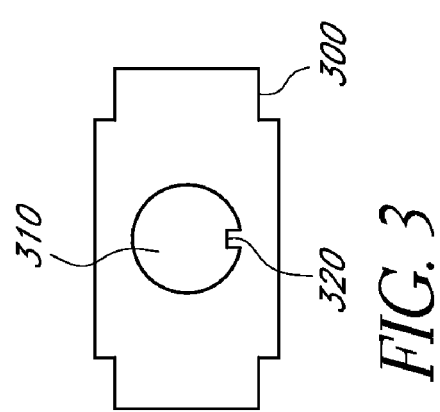
FIG. 3 is a side view of a main body in accordance with one embodiment of a flow control device.

FIG. 3 is a side view of a main body in accordance with one embodiment. The illustrated main body 300 includes a cavity 310 and a tongue 320. As described above with reference to FIGS. 1-2, the cavity 310 may serve to allow the insertion of a flow adjustment member. The tongue 320 may be configured to engage a corresponding groove on a flow adjustment member, such as the groove 760 of the flow adjustment member 700 of FIG. 7. As skilled artisans will recognize, the tongue 320 and groove (e.g., 760) may be adapted to prevent the flow adjustment member from rotating, while still allowing the member to slide along an axis. Although the main body 300 is illustrated as having a tongue 320, the main body 300 could alternatively or additionally include a groove adapted to engage a tongue, such as the tongue 270 of the flow adjustment member 200 of FIG. 2.

Figure 4:
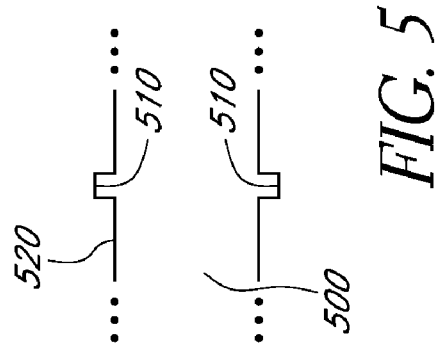
FIG. 4 is a side view of a main body in accordance with another embodiment of a flow control device.

FIG. 4 is a side view of a main body in accordance with another embodiment. The illustrated main body 400 includes a cavity 410, which may be adapted to receive a flow adjustment member. As illustrated in FIG. 4, the cavity 410 has a non-circular cross-section that inhibits rotation of the flow adjustment member when the cross-section of the flow adjustment member closely conforms to that of the cavity 410. Persons of ordinary skill in the art will recognize that the cavity 410 may have a cross-section that is elliptical (as shown), rectangular, square or a variety of other shapes that inhibit rotation of the like-shaped flow adjustment member when inserted into the cavity 410. However, a curved shape (such as the illustrated elliptical shape) is easier for an o-ring or other type of flexible seal to conform with. Curved shapes other than elliptical are also possible. As skilled artisans will recognize, after insertion of a flow adjustment member having a substantially similar cross-section, the non-circular shape of the cavity 410 prevents the flow adjustment member from rotating, while still allowing the member to slide along an axis. Thus, the non-circular shape serves a similar purpose as the tongue-and-groove features described above.

Figure 5:
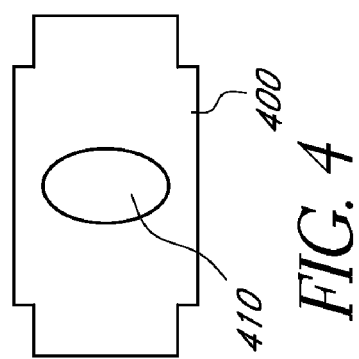
FIG. 5 is a partial cross-sectional view of a cavity of the main body in accordance with one embodiment of a flow control device.

FIG. 5 is a partial cross-sectional view of the cavity of the main body in accordance with another embodiment. As described above with reference to FIGS. 1-4, the cavity 500 may be adapted to receive a flow adjustment member (e.g. 200). The inner periphery 520 of the cavity 500 may include one or more o-ring grooves 510 adapted to receive an o-ring (e.g. 100). Insertion of one or more o-rings into the o-ring grooves 510 may aid in preventing fluid leakage once the flow adjustment member is inserted into the cavity 500 of the main body.

Figure 6:
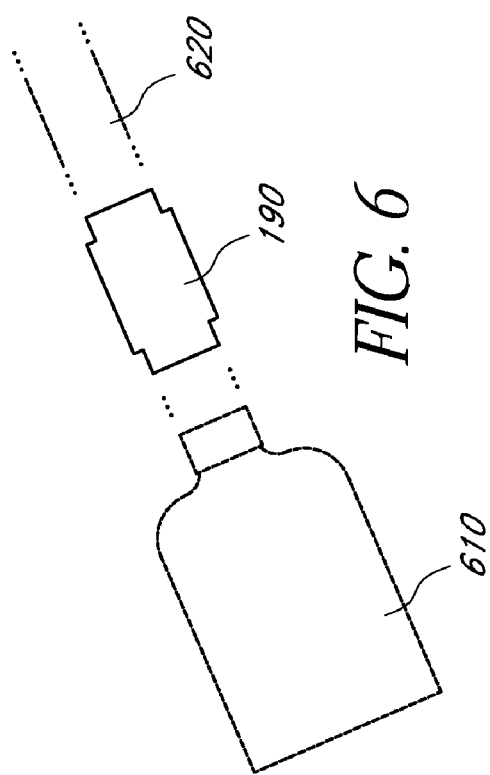
FIG. 6 illustrates a flow control device attached to a water supply pipe and showerhead.

FIG. 6 illustrates a flow control device attached to a water supply pipe and showerhead. As illustrated in FIG. 6, the flow control device 190 (or any other embodiment described herein) may be attached to a showerhead 610 and a pipe 620. Although the flow control device 190 is illustrated as being attached to the showerhead 610, persons of ordinary skill in the art will recognize that the flow control device 190 may also be attached to pipes on both ends. It will also be understood that the flow control devices described herein can be used in any of a variety of different contexts involving fluid flow, in which the rate of fluid flow is desired to be regulated.

Figure 7A:
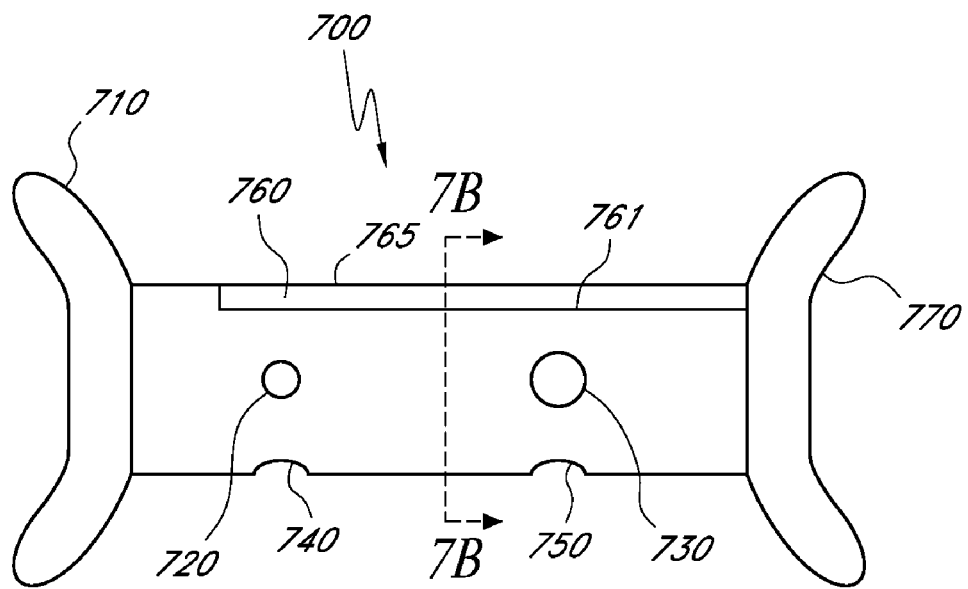
FIG. 7A is an axial cross-section (taken along line 7A-7A of FIG. 7B) of a flow adjustment member in accordance with another alternative embodiment of a flow control device.
Figure 7B:
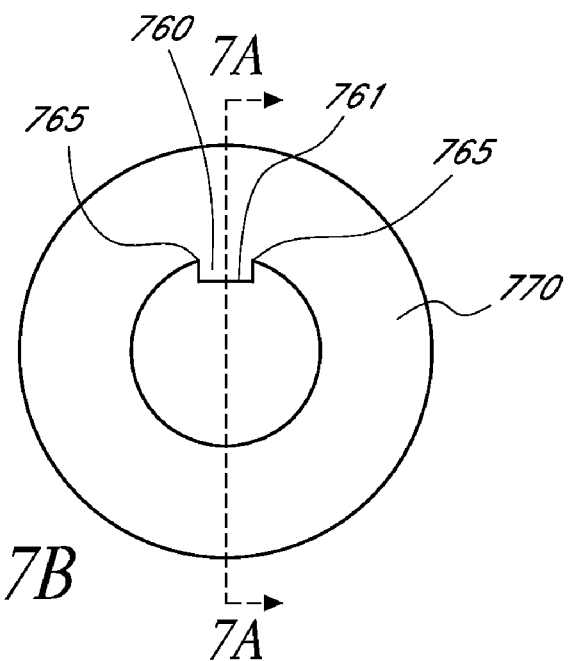
FIG. 7B is a lateral cross-section of the flow adjustment member of FIG. 7A (taken along line 7B-7B of FIG. 7A).

FIG. 7A is an axial cross-section (taken along the line 7A-7A of FIG. 7B) of a flow adjustment member in accordance with another alternative embodiment of a flow control device. FIG. 7B is a lateral cross-section thereof (taken along the line 7B-7B of FIG. 7A). The illustrated flow adjustment member 700 includes a first fluid flow channel 720, a second fluid flow channel 730, a first pin groove 740, a second pin groove 750, a push-pull knob 710, a removable push-pull knob 770, and axial groove 760. Skilled artisans will recognize that the illustrated flow adjustment member 700 may be inserted in a main body (e.g., 10) to form an assembled fluid control device, as described above with reference to FIG. 1. In particular, the main body may include a cavity (e.g., 162) and a fluid flow passage (e.g., 170), wherein the cavity may intersect the fluid flow passage. Furthermore, the cavity may be adapted to receive the flow adjustment member 700. The main body may also include one or more securing pin passages (e.g., 110) having one or more securing pins (e.g., 120) and pin caps (e.g., 130). The cavity of the main body described above may be adapted to allow the flow adjustment member 700 to move within the cavity to two or more positions, such as by sliding axially. In one embodiment, when the flow adjustment member 700 is inserted into the main body as described above, the flow adjustment member may axially slide within the cavity such that either the first fluid flow channel 720 or the second fluid flow channel 730 fluidly communicates with the fluid flow passage of the main body, thereby controlling the flow of fluid through the assembled fluid control device.

With continuing reference to FIG. 7A, the illustrated flow adjustment member 700 has a removable push-pull knob 770. Removal of the removable push-pull knob 770 may facilitate insertion of the flow adjustment member 700 in an embodiment in which the cavity of the main body is a passage extending entirely through the main body. After insertion of the flow adjustment member 700, the removable push-pull knob 770 may be reattached to assist the user in sliding of the member 700 to multiple positions within the cavity. However, skilled artisans will recognize that the embodiment illustrated in FIG. 7A may be used in conjunction with a main body not having a cavity extending entirely through the main body. For example, the flow adjustment member 700 could be used with such a body by removing the removable push-pull knob 770. Moreover, it will be understood that certain embodiments do not include the removable push-pull knob 770.

Referring to FIGS. 7A and 7B, the illustrated flow adjustment member 700 includes an axial groove 760 having a floor 761 and defining a pair of shoulders 765. The groove 760 may engage a corresponding tongue within the cavity of the main body (e.g., tongue 320 shown in FIG. 3) in order to prevent the flow adjustment member 700 from rotating.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An apparatus configured to control a rate of flow of fluid, comprising:
   a flow adjustment member having first and second fluid flow channels therethrough, the first and second fluid flow channels having substantially different cross-sectional sizes, the flow adjustment member also having first and second securing pin recesses; and
   a main body comprising:
   a fluid inlet;
   a fluid outlet;
   a fluid flow passage extending from the inlet to the outlet;
   a cavity adapted to receive the flow adjustment member, wherein the flow adjustment member is moveable within the cavity to a first position in which the first fluid flow channel fluidly communicates with the fluid flow passage of the main body, and wherein the flow adjustment member is moveable within the cavity to a second position in which the second fluid flow channel fluidly communicates with the fluid flow passage of the main body; and at least one securing pin passage adapted to receive a securing pin configured to engage the first securing pin recess or the second securing pin recess, such that engagement of the securing pin with either the first securing pin recess or the second securing pin recess causes the securing pin to resist movement of the flow adjustment member until a movement force acting on the flow adjustment member exceeds a threshold, wherein the flow adjustment member, when received within the cavity, is rotatable between the first and second positions, wherein the first securing pin recess and the second securing pin recess are positioned within an annular pin groove, and wherein the at least one securing pin engages the annular pin groove when the securing pin is received within the securing pin passage.

2. The apparatus of claim 1, wherein the inlet is adapted to connect to and fluidly communicate with a water pipe, and the outlet is adapted to connect to and fluidly communicate with a showerhead apparatus.

3. The apparatus of claim 1, wherein the flow adjustment member is moveable to a third position within the cavity, in which the first fluid flow channel fluidly communicates with the fluid flow passage of the main body, and wherein the flow adjustment member is moveable to a fourth position within the cavity, in which the second fluid flow channel fluidly communicates with the fluid flow passage of the main body, wherein the flow adjustment member is configured such that a ninety (90) degree rotation of the flow adjustment member toggles the flow adjustment member (1) between the first and second positions, (2) between the first and fourth positions, (3) between the second and third positions, or (4) between the third and fourth positions.

4. The apparatus of claim 1, wherein the flow adjustment member, when received within the cavity, is axially slidable between the first and second positions.

5. The apparatus of claim 1, further comprising said securing pin.

6. The apparatus of claim 1, wherein said at least one securing pin passage comprises two securing pin passages adapted to simultaneously receive two securing pins, the two securing pins configured to simultaneously engage (1) the first securing pin recess and a third securing pin recess on the flow adjustment member or (2) the second securing pin recess and a fourth securing pin recess on the flow adjustment member, such that simultaneous engagement of the two securing pins with (1) the first and third securing pin recesses or (2) the second and fourth securing pin recesses causes the two securing pins to resist movement of the flow adjustment member until a movement force acting on the flow adjustment member exceeds a threshold.

* * * * *